US012664749B2

(12) United States Patent (10) Patent No.: US 12,664,749 B2
Chien et al. (45) Date of Patent: Jun. 23, 2026

(54) DEEP RECOGNITION MODEL TRAINING METHOD, ELECTRONIC DEVICE AND READABLE STORAGE MEDIUM

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 777 days.

(21) Appl. No.: 18/094,578

(22) Filed: Jan. 9, 2023

(65) Prior Publication Data

US 2024/0046601 A1 Feb. 8, 2024

(30) Foreign Application Priority Data

Jul. 26, 2022 (CN) .......................... 202210881990.9

(51) Int. Cl.
| | |
|---|---|
| *G06V 10/26* | (2022.01) |
| *G06V 10/764* | (2022.01) |
| *G06V 10/77* | (2022.01) |
| *G06V 10/774* | (2022.01) |
| *G06V 10/82* | (2022.01) |
| *G06V 20/64* | (2022.01) |

(52) U.S. Cl.
CPC ............ *G06V 10/26* (2022.01); *G06V 10/764* (2022.01); *G06V 10/7715* (2022.01); *G06V 10/7747* (2022.01); *G06V 10/82* (2022.01); *G06V 20/64* (2022.01)

(58) Field of Classification Search
CPC .. G06V 10/26; G06V 10/764; G06V 10/7715; G06V 10/7747; G06V 10/82; G06V 20/64
See application file for complete search history.

(56) References Cited

U.S. PATENT DOCUMENTS

| | | | |
|---|---|---|---|
| 2022/0309672 A1* | 9/2022 | Cherian ................. | G06N 3/094 |
| 2024/0338938 A1* | 10/2024 | Filimonov ............. | G06V 20/70 |

FOREIGN PATENT DOCUMENTS

| | | | | |
|---|---|---|---|---|
| CN | 108876799 A | * 11/2018 | ............. | G06N 3/045 |
| CN | 110197215 | 9/2019 | | |

(Continued)

OTHER PUBLICATIONS

Markus. Schoen et al;MGNet: Monocular Geometric Scene Understanding for Autonomous Driving;Jun. 27, 2022; pp. 1 1-14;arXiv:2206.13199.

*Primary Examiner* — Michael J Vanchy, Jr.

(74) *Attorney, Agent, or Firm* — ScienBiziP, P.C.

(57) ABSTRACT

A deep recognition model training method applied to an electronic device is provided. The method includes obtaining a ground plane area by segmenting a first image using a ground plane segmentation network. A projection image of the first image is generated based on the first image, an initial depth image corresponding to the first image, and a pose matrix. A target height loss of a depth recognition network is generated, and a depth loss of the depth recognition network is obtained according to a gradient loss between the initial depth image and the first image and a photometric loss between the projection image and the first image. A depth recognition model is obtained by adjusting the depth recognition network based on the depth loss and the target height loss.

18 Claims, 5 Drawing Sheets

(56) References Cited

FOREIGN PATENT DOCUMENTS

| | | | | |
|---|---|---|---|---|
| CN | 110197215 A | * | 9/2019 | ............. G06T 7/136 |
| CN | 108876799 | | 7/2021 | |
| CN | 113724155 | | 11/2021 | |

* cited by examiner

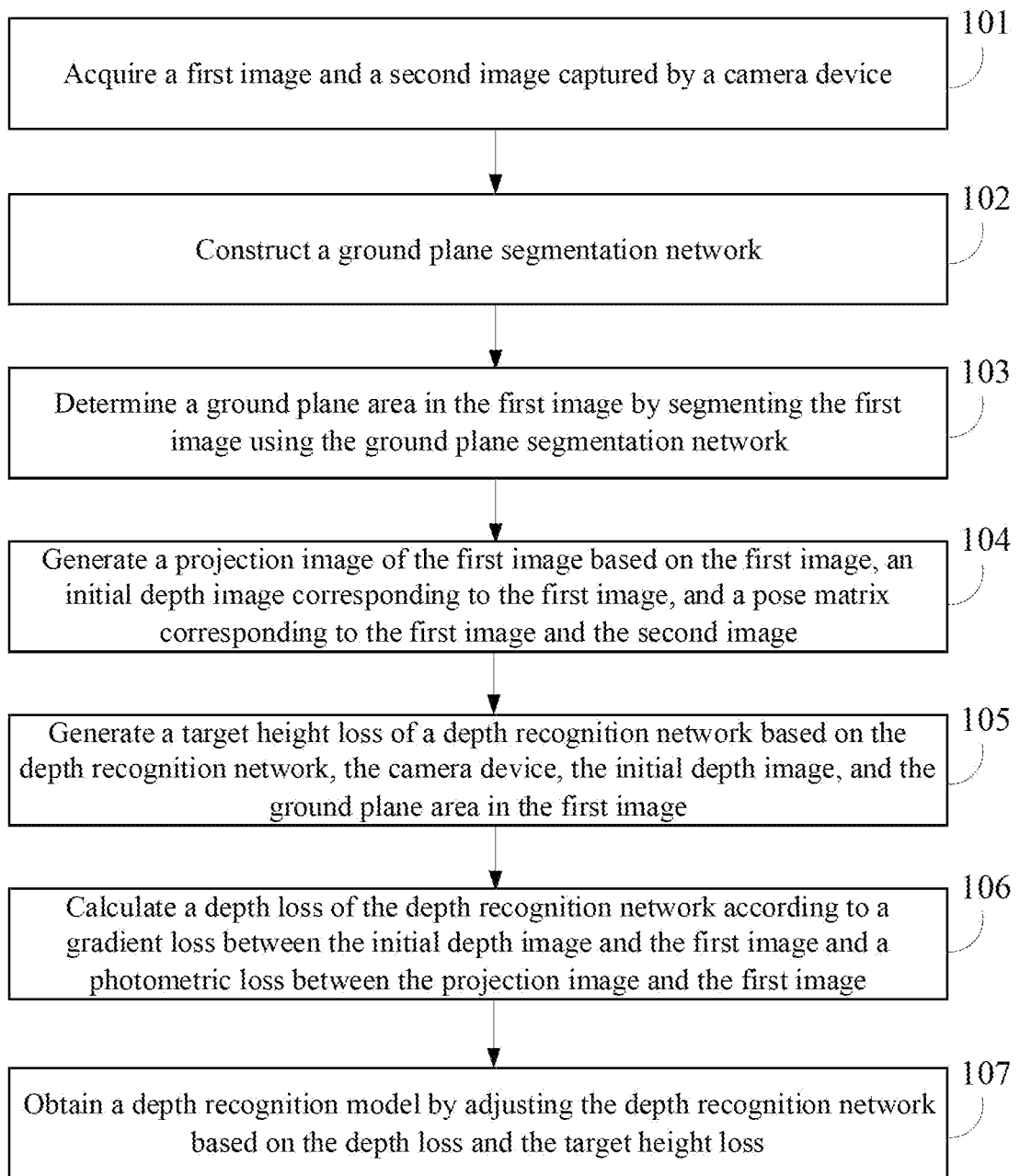

Acquire a first image and a second image captured by a camera device — 101

Construct a ground plane segmentation network — 102

Determine a ground plane area in the first image by segmenting the first image using the ground plane segmentation network — 103

Generate a projection image of the first image based on the first image, an initial depth image corresponding to the first image, and a pose matrix corresponding to the first image and the second image — 104

Generate a target height loss of a depth recognition network based on the depth recognition network, the camera device, the initial depth image, and the ground plane area in the first image — 105

Calculate a depth loss of the depth recognition network according to a gradient loss between the initial depth image and the first image and a photometric loss between the projection image and the first image — 106

Obtain a depth recognition model by adjusting the depth recognition network based on the depth loss and the target height loss — 107

FIG. 2

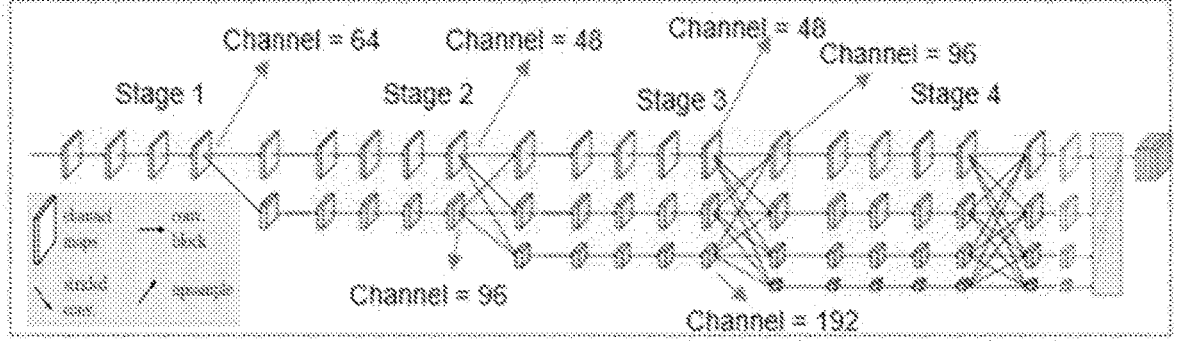
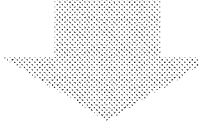
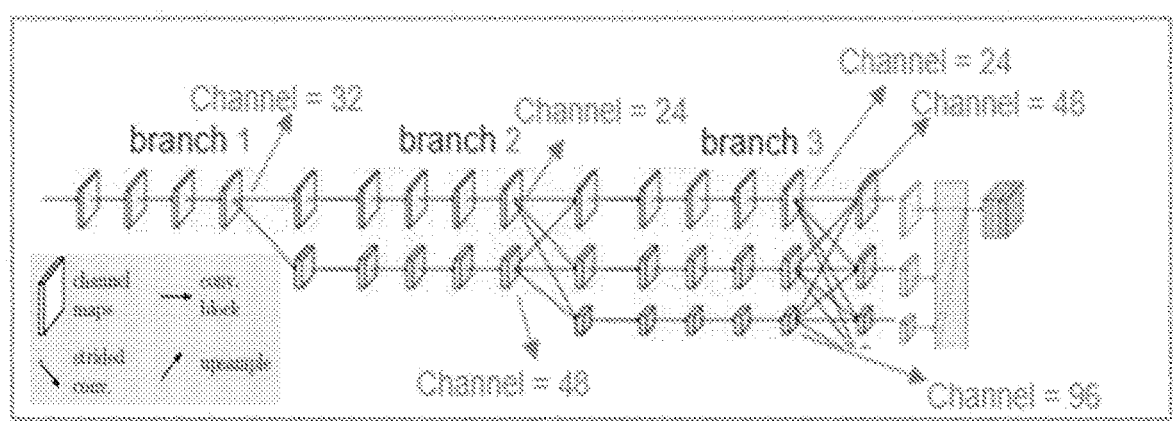
FIG. 3

DEEP RECOGNITION MODEL TRAINING METHOD, ELECTRONIC DEVICE AND READABLE STORAGE MEDIUM

FIELD

The present disclosure relates to image processing technology, in particular to a deep recognition model training method, an electronic device, and a readable storage medium.

BACKGROUND

Generally, when performing depth recognition on an image captured by a vehicle-mounted device, an image segmentation network is used to segment the image, and then depth recognition is performed based on the segmented image. However, because network parameters of the image segmentation network are many and complex, a process of image segmentation takes a long time, resulting in a low efficiency of image depth recognition. Therefore, how to improve an efficiency of image depth recognition is a technical problem that needs to be solved.

BRIEF DESCRIPTION OF THE DRAWINGS

FIG. 2 is a flowchart of an embodiment of the deep recognition model training method of the present disclosure.

FIG. 3 is a schematic structural diagram of a ground plane segmentation network provided by an embodiment of the present disclosure.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
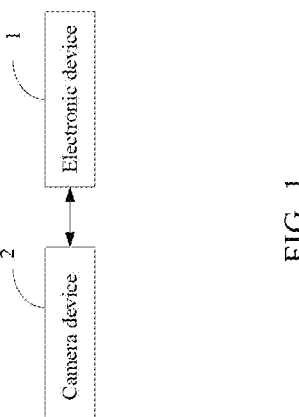
FIG. 1 is an embodiment of an application environment diagram of a deep recognition model training method of the present disclosure.

FIG. 1 is an application environment diagram of one embodiment of the present disclosure. A deep recognition model training method and an image depth recognition method provided by the present disclosure can be applied to one or more electronic devices 1. Each of the one or more electronic devices can communicate with a camera device 2, and the camera device 2 may be a monocular camera, or may be other devices for capturing images.

The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

FIG. 2 is a flowchart of one embodiment of the deep recognition model training method of the present disclosure. According to different requirements, a sequence of each block in this flowchart can be adjusted according to actual requirements, and some blocks can be omitted. The execution body of this method can be an electronic device, such as the electronic device 1 shown in FIG. 1.

At block 101, the electronic device acquires a first image and a second image captured by the camera device.

In at least one embodiment of the present disclosure, the camera device may be a monocular camera, the first image and the second image are images of three primary colors (Red Green Blue, RGB) and are adjacent frames. A capture time of the second image is later than a capture time of the first image. The first image and the second image may include objects (hereinafter named as "initial objects") such as vehicles, ground, pedestrians, sky, trees, etc. The first image and the second image contain same initial objects.

At block 102, the electronic device constructs a ground plane segmentation network.

In at least one embodiment of the present disclosure, the ground plane segmentation network refers to a network for segmenting a ground plane in an image.

In at least one embodiment of the present disclosure, the constructing the ground plane segmentation network includes:

The electronic device acquires a high-resolution network, wherein the high-resolution network includes a first-stage network, a second-stage network, a third-stage network, a fourth-stage network, and an output layer; the electronic device removes the fourth-stage network, and adjusts a number of branch networks in the output layer to be a number of branch networks in the third-stage network, and obtains an output layer corresponding to each branch network in the third-stage network; the device counts a number of first channels of a last convolutional layer in a backbone network of the first-stage network; obtains a first resolution network by adjusting the number of first channels to a first preset value; obtains a second resolution network by adjusting a number of channels of a last convolutional layer in the second-stage network; and obtains a third resolution network by adjusting a number of channels of a last convolutional layer in the third-stage network; and obtain an image resolution network by splicing the first resolution network, the second resolution network and the third resolution network; and obtains the ground plane segmentation network by splicing the image resolution network and the output layer corresponding to each branch network in the third stage network.

The high-resolution network (High-Resolution Net v2, HRNet v2) may be obtained from the Internet, and the first preset value is smaller than the number of first channels. For example, the first preset value may be half of the number of the first channels.

In at least one embodiment of the present disclosure, the number of output layers is the same as the number of branch networks in the third-stage network, and each output layer is connected to a corresponding branch network in the third-stage network, for example, a number of branch networks in the third-stage network is three, and a number of the output layers is adjusted to three.

In at least one embodiment of the present disclosure, the number of branches in a previous resolution network is the same as the number of backbone networks in a next resolution network. When there is a plurality of backbone networks, each backbone network is connected in parallel with each other.

As shown in FIG. 3, which is a schematic structural diagram of a ground plane segmentation network provided by an embodiment of the present disclosure, the first resolution network includes a backbone network and two branch networks, and the backbone network is connected to each of the two branch networks, the second resolution network includes two backbone networks connected in parallel and three branch networks, each of two backbone networks in the second resolution network is connected to each of the three branch networks, and the third resolution network includes three backbone networks connected in parallel and three branch networks, the output layer includes three layers, and each backbone network of the first resolution network, the second resolution network and the third resolution network contains four convolutional layers, when a number of channels of the last convolutional layer of the backbone network of the first stage network (stage1) equals 64, the number of channels of the last convolutional layer of the backbone network in the first resolution network (branch1) can be 32; when the number of channels of the last convolutional layer in the first backbone network of the second stage network (stage2) equals 48, the number of channels of the last convolutional layer of the first backbone network in the second resolution network (branch2) can be 24; when the number of channels of the last convolutional layer of the last convolutional layer in the second backbone network of the second stage network (stage2) equals 96, the number of channels of the last convolutional layer of the second backbone network in the second resolution network (branch2) can be 48; when the number of channels of the last convolutional layer in the first backbone network of the third stage network (stage3) equals 48, the number of channels of the last convolutional layer of the first backbone network in the third resolution network (branch3) can be 24; when the number of channels of the last convolutional layer in the second backbone network of the third stage network (stage3) equals 96, the number of channels of the last convolutional layer of the second backbone network in the third resolution network (branch3) can be 48; when the number of channels of the last convolutional layer in the third backbone network of the third-stage network (stage3) equals 192, so the number of channels of the last convolutional layer of the third backbone network in the third resolution network (branch3) can be 96.

In this embodiment, by reducing the number of channels of the last convolutional layer in the backbone network of each resolution network, a large number of parameters of the ground plane segmentation network can be reduced.

At block 103, the electronic device determines a ground plane area in the first image by segmenting the first image using the ground plane segmentation network.

In at least one embodiment of the present disclosure, the ground plane segmentation network further includes a classification layer, and the determining the ground plane area in the first image by segmenting the first image using the ground plane segmentation network includes:

Inputting the first image into the image resolution network of the ground plane segmentation network, and obtaining a plurality of third branch feature maps each of which being output by each branch network in the third resolution network of the image resolution network; obtaining a plurality of target feature maps by inputting each of the plurality of third branch feature maps into a corresponding output layer to perform a convolution operation; obtaining a fused feature map by performing feature fusion on the plurality of target feature maps; obtaining a category corresponding to each initial object in the first image by inputting the fused feature map into the classification layer for classification; and determining an area occupied by an initial object corresponding to a category of ground plane as the ground plane area.

Wherein, the category may be the ground plane, road, pedestrian, sky, and so on.

The electronic device inputs the plurality of target feature maps into a 1×1 convolution layer to perform the convolution operation to obtain the fused feature map. The classification layer may be a softmax layer.

Specifically, the inputting the first image into the image resolution network of the ground plane segmentation network, and obtaining the plurality of third branch feature maps each of which being output by each branch network in the third resolution network of the image resolution network includes:

Obtaining a first backbone feature map output by the backbone network of the first resolution network by inputting the first image into the backbone network of the first resolution network for feature extraction; obtaining a plurality of first branch feature maps each of which being output by each branch network in the first resolution network by inputting the first backbone feature map into each branch network of the first resolution network for performing a convolution operation; obtaining a plurality of second branch feature maps each of which being output by the second resolution network by inputting the plurality of first branch feature maps into the second resolution network for feature extraction; and obtaining the plurality of third branch feature maps by inputting the plurality of second branch feature maps into the third resolution network for performing feature extraction.

In this embodiment, a process of feature extraction of the second resolution network and a process of feature extraction of the third resolution network are basically the same as that of the first resolution network, which will not be described in detail in the present disclosure. A resolution of each backbone network in the second resolution network is different a resolution of each backbone network in the third resolution network. The resolution of each backbone network in the second resolution network is different from each other, and the resolution of each backbone network in the third resolution network is different from each other.

Through the above-mentioned embodiments, since parameters of the ground plane segmentation network are reduced, a running speed of the ground plane segmentation network can be improved, so that the ground plane region can be quickly determined.

At block 104, the electronic device generates a projection image of the first image based on the first image, a depth image (initial depth image) corresponding to the first image, and a pose matrix corresponding to the first image and the second image.

In at least one embodiment of the present disclosure, the initial depth image refers to an image containing depth information, wherein the depth information refers to a distance between an initial object corresponding to each pixel in the first image and the camera device. The camera device may be a monocular camera.

In at least one embodiment of the present disclosure, the pose matrix refers to a transformation relationship between camera coordinates of pixels in the first image and camera coordinates of corresponding pixels in the second image, and the camera coordinates of each pixel refer to coordinates of the each pixel in a camera coordinate system.

Figure 4:
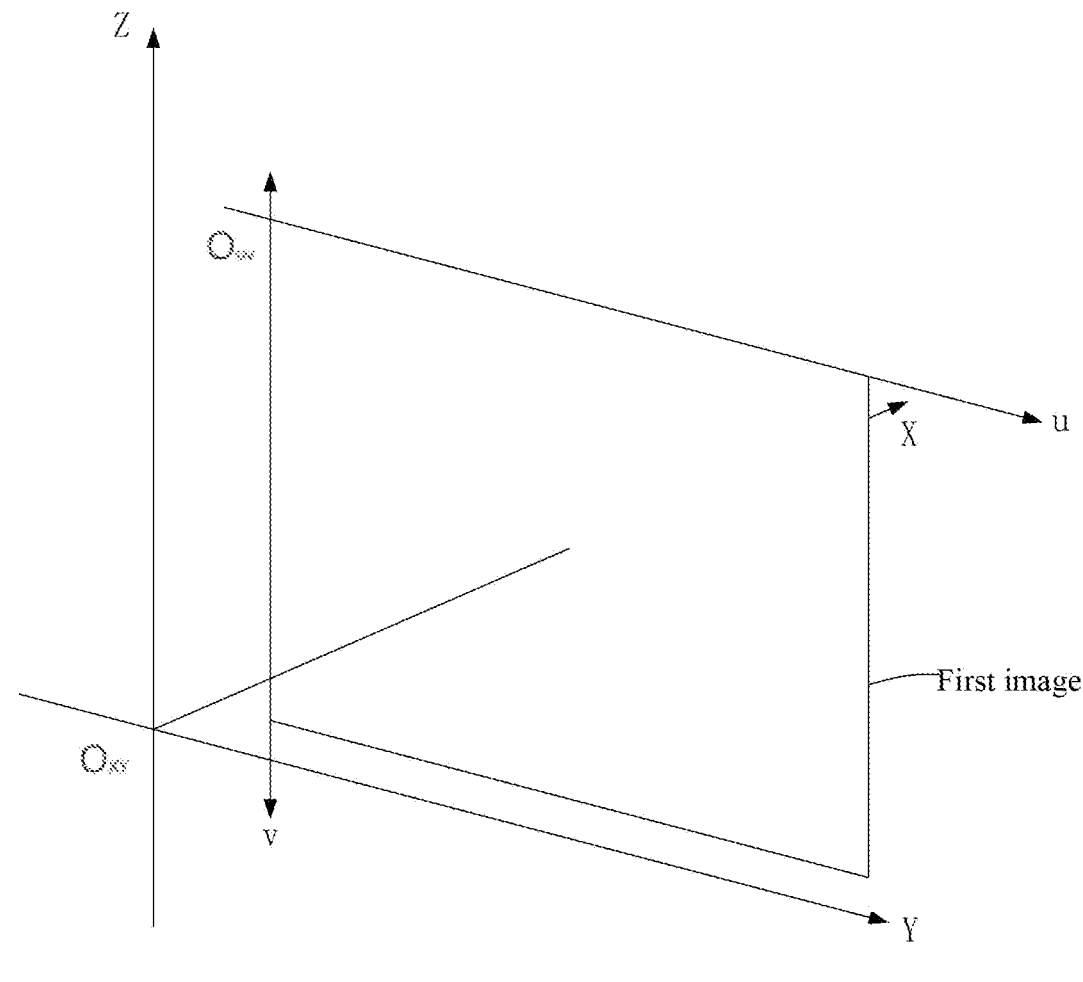
FIG. 4 is a schematic diagram of a pixel coordinate system and a camera coordinate system provided by an embodiment of the present disclosure.

As shown in FIG. 4, which is a schematic diagram of a pixel coordinate system and a camera coordinate system provided by an embodiment of the present disclosure, the electronic device takes a pixel point Ouv of a first row and a first column of the first image as the origin, takes a parallel line where the pixel points of the first row are located as the u-axis, and takes a vertical line where the pixel points of the first column are located as the v-axis to construct the pixel coordinate system. In addition, the electronic device takes a light spot OXY of the monocular camera as the origin, takes an optical axis of the monocular camera as the X axis, takes a parallel line of the u axis of the pixel coordinate system as the Y axis, and takes a line parallel to the v-axis of the pixel coordinate system as the Z-axis to construct the camera coordinate system.

In at least one embodiment of the present disclosure, the projection image represents an image of a transformation process, and the transformation process refers to transformation between pixel coordinates of the pixel points in the first image and pixel coordinates of corresponding pixel points in the second image process.

In at least one embodiment of the present disclosure, the generating the projection image of the first image based on the first image, the initial depth image corresponding to the first image, and the pose matrix corresponding to the first image and the second image includes:

Determining pixel points corresponding to a same initial object in the first image as first pixel points, and determining pixel points corresponding to the same initial object in the second image as second pixel points; obtaining a first homogeneous coordinate matrix of the first pixel points, obtaining a second homogeneous coordinate matrix of the second pixel points; obtaining an inverse matrix of an internal reference matrix of the camera device; calculating first camera coordinates of the first pixel points according to the first homogeneous coordinate matrix and the inverse matrix of the internal reference matrix; calculating second camera coordinates of the second pixel points according to the second homogeneous coordinate matrix and the inverse matrix of the internal parameter matrix; obtaining a rotation matrix and a translation matrix according to the first camera coordinates and the second camera coordinates based on a preset epipolar constraint relationship; obtaining the pose matrix by splicing the rotation matrix and the translation matrix; obtaining a homogeneous coordinate matrix of each pixel point in the first image, and obtaining a depth value of each pixel point in the first image from the initial depth image; calculating coordinates (projection coordinates) of each pixel point in the first image based on the pose matrix, each homogeneous coordinate matrix of each pixel point and the depth value of each pixel point; obtaining the projected image by arranging the pixel points of the first image according to the projection coordinates of the pixel points.

The depth value refers to a pixel value of each pixel point in the initial depth image.

In at least one embodiment of the present disclosure, a method of inputting the first image into a depth recognition network to generate the initial depth image is in the prior art, which will not be repeated in the present disclosure.

Wherein, the first homogeneous coordinate matrix of the first pixel point refers to a matrix whose dimension is one more dimension (extra dimension) than that of the pixel coordinate matrix, and an element value of the extra dimension is 1, and the pixel coordinate matrix refers to a matrix generated according to the first pixel coordinates of the first pixel points, the first pixel coordinates refer to the coordinates of the first pixel points in the pixel coordinate system, for example, the first pixel coordinates of a first pixel point in the pixel coordinate system is (u, v), and the pixel coordinate matrix of the first pixel point is $$\begin{bmatrix} u \\ v \end{bmatrix};$$

then the homogeneous coordinate matrix of this pixel point is $$\begin{bmatrix} u \\ v \\ 1 \end{bmatrix}.$$

Multiply the first homogeneous coordinate matrix and the inverse matrix of the internal parameter matrix to obtain the first camera coordinates of the first pixel point, and multiply the second homogeneous coordinate matrix and the inverse matrix of the internal parameter matrix to obtain the second camera coordinates of the second pixel point.

Wherein, the method of the second homogeneous coordinate matrix is basically the same as the method of generating the first homogeneous coordinate matrix, which is not repeated in the present disclosure.

The rotation matrix can be expressed as:

$$\text{pose} = \begin{bmatrix} R & t \\ 0 & 1 \end{bmatrix};$$

Wherein, pose represents the pose matrix, the pose matrix is a 4×4 matrix, R represents the rotation matrix, the rotation matrix is a 3×3 matrix, t is the translation matrix, and the translation matrix is a 3×1 matrix.

Wherein, a calculation formula of the translation matrix and the rotation matrix is:

$$K^{-1}p_1(t x R)\left(K^{-1}p_2\right)^T = 0;$$

Wherein, $K^{-1}p_1$ represents the first camera coordinates, $K^{-1}p_2$ represents the second camera coordinates, $p_1$ represents the first homogeneous coordinate matrix, $p_2$ represents the second homogeneous coordinate matrix, $K^{-1}$ represents the inverse matrix of the internal parameter matrix.

In this embodiment, the translation matrix and the rotation matrix are calculated, an attitude of each pixel point in the first image can be obtained according to the rotation matrix, and a position of each pixel point in the first image can be obtained according to the translation matrix.

Specifically, a formula for calculating the projection coordinates of each pixel point in the projected image is:

$$P = K * \text{pose} * Z * K^{-1} * H;$$

Among them, P represents the projection coordinates of each pixel point, K represents the internal parameter matrix of the camera device, pose represents the pose matrix, $K^{-1}$ represents the inverse matrix of K, and H represents a target homogeneous coordinate matrix of each pixel point in the first image, Z represents the depth value of the corresponding pixel point in the initial depth image.

At block 105, the electronic device generates a target height loss of a depth recognition network based on the depth recognition network, the camera device, the initial depth image, and the ground plane area in the first image.

In at least one embodiment of the present disclosure, the depth recognition network refers to a network capable of recognizing depth information in an image. In at least one embodiment of the present disclosure, the target height loss refers to a difference between a predicted height and a real-world height, and the predicted height refers to a distance between the pixel point in the first image and the camera device predicted by the depth recognition network and the real-world height refers to a distance between the initial object corresponding to the pixel point in the first image and the camera device in reality.

In at least one embodiment of the present disclosure, the generating the target height loss of the depth recognition network based on the depth recognition network, the camera device, the initial depth image, and the ground plane area in the first image includes:

Acquiring a real world height from an optical center of the camera device to the ground plane area; constructing a camera coordinate system based on the first image and the camera device; calculating a projection height according to the coordinates of each ground pixel point of the ground plane area in the constructed camera coordinate system; calculating the target height loss according to the pixel coordinates of the pixel points in the initial depth image, the projection height, and the real world height.

Among them, the constructed camera coordinate system is shown as in FIG. 4.

Specifically, the calculating the projection height according to the coordinates of each ground pixel point of the ground plane area in the constructed camera coordinate system includes:

Obtaining coordinates of any one ground pixel point in the ground plane area in the camera coordinate system; calculating a unit normal vector according to the coordinates of any one ground pixel point; determining the optical center of the camera device as a starting point, and determining each ground pixel point as an end point; determining a vector formed by the starting point and the end point as a target vector of each ground pixel point; calculating a projection distance corresponding to each ground pixel point according to the target vector of each ground pixel point and the unit normal vector; obtaining the projection height by performing a weighted average operation on the projection distances corresponding to all ground pixel points.

Wherein, a formula of calculating the unit normal vector is:

$$N_t = \left(P_t P_t^T\right)^{-1} P_t;$$

Wherein, $N_t$ represents the unit normal vector, $P_t$ represents coordinates of any one ground pixel point in the ground plane area in the camera coordinate system, and $P_t^T$ represents the target vector.

In this embodiment, the projection height refers to a weighted average of a plurality of projection distances between all the pixel points in the first image and the camera device, since coordinates of all pixel points in the ground plane area are involved in the calculation, so the projection height can be made more accurate.

In one embodiment, the calculating the target height loss according to the pixel coordinates of the pixel points in the initial depth image, the projection height, and the real world height includes:

Calculating a height ratio between the real world height and the projection height; obtaining depth coordinates corresponding to each pixel point by multiplying the height ratio with the pixel coordinates of each pixel point in the initial depth image; generating a first height loss according to the pixel coordinates and the corresponding depth coordinates of each pixel point in the initial depth image; obtaining a multiplication matrix by multiplying the translation matrix and the height ratio; generating a second height loss according to the multiplication matrix and the translation matrix; generating the target height loss based on the first height loss and the second height loss.

The formula of calculating the first height loss is:

$$L_d = \sum_{i=1}^{n} \frac{\left|D_t^i(u, v) - D^i(u, v)\right|}{D(u, v)};$$

Wherein, the $L_d$ represents the first height loss, n represents a number of all pixel points in the initial depth image, i represents the ith pixel point in the initial depth image, and $D_t^i(u, v)$ represents the depth coordinate corresponding to the ith pixel point in the initial depth image, and $D^i(u, v)$ represents the pixel coordinates of the ith pixel point in the initial depth image.

A formula of calculating the second height loss is:

$$L_{ts} = |t_s - t|;$$

Wherein, $L_{ts}$ represents the second height loss, $t_s$ represents the multiplication matrix, and t represents the translation matrix.

Wherein, the electronic device performs a weighted average operation on the first height loss and the second height loss to obtain the target height loss.

Through the above embodiment, the target height loss is calculated according to the pixel coordinates of the pixel points in the initial depth image, the projection height and the real world height. Since the projection height is more accurate, the target height loss can be reduced faster.

At block 106, the electronic device calculates a depth loss of the depth recognition network according to a gradient loss between the initial depth image and the first image and a photometric loss between the projection image and the first image.

In at least one embodiment of the present disclosure, the depth loss equals a sum of the photometric loss and the gradient loss.

Specifically, a calculation formula of the depth loss is:

$$Lc = Lt + Ls$$

Lc represents the depth loss, Lt represents the photometric loss, and Ls represents the gradient loss.

Wherein, the calculation formula of the photometric loss is:

$$Lt = \alpha SSIM(x, y) + (1 - \alpha)\|x_i - y_i\|;$$

Wherein Lt represents the photometric loss, a represents a preset balance parameter, and can be 0.85, SSIM(x, y) represents a structural similarity index between the projected image and the first image, $\|x_i - y_i\|$ represents a grayscale difference between the projected image and the first image, $x_i$ represents the pixel value of the ith pixel point of the projected image, and $y_i$ represents a pixel value of the pixel point corresponding to the ith pixel point in the first image.

Wherein, a calculation formula of the structural similarity index is:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)};$$

$$c_1 = (K_1 L)^2;$$

$$c_2 = (K_2 L)^2;$$

Wherein, SSIM(x, y) represents the structural similarity index, x represents the projected image, y represents the first image, $\mu_x$ represents an average grayscale value of the first image, $\mu_y$ represents an average grayscale value of the first image, $\sigma_x$ represents a grayscale standard deviation of the projected image, $\sigma_y$ represents a grayscale standard deviation of the first image, and $\sigma_{xy}$ represents a grayscale value covariance between the projected image and the first image, $c_1$ and $c_2$ represent preset parameters, L represents a maximum pixel value of the pixel points in the first image, $K_1$ and $K_2$ represent preset constants, and $K_1 \ll 1$, $K_2 \ll 1$.

Specifically, the electronic device calculates the gradient loss between the initial depth image and the first image according to a formula:

$$Ls = \sum_{i \in \{x,y\}} \left|\partial_i \left(\frac{1}{D(u, v)}\right)\right| e^{-\|\partial_i I(u,v)\|};$$

Wherein, Ls represents the gradient loss, x represents the initial depth image, y represents the first image, D(u, v) represents the pixel coordinates of the ith pixel point in the initial depth image, I(u, v) represents the pixel coordinates of the ith pixel point in the first image.

In this embodiment, since the depth loss includes changes in the photometric and gradient of each pixel point in the first image to the corresponding pixel point in the second image, the depth loss can be more accurate to reflect the difference between the first image and the second image.

At block 107, the electronic device obtains a depth recognition model by adjusting the depth recognition network based on the depth loss and the target height loss.

In at least one embodiment of the present disclosure, the depth recognition model refers to a model generated by adjusting the depth recognition network.

In at least one embodiment of the present disclosure, the obtaining the depth recognition model by adjusting the depth recognition network based on the depth loss and the target height loss includes:

Calculating an overall loss of the depth recognition network based on the depth loss and the target height loss; obtaining the deep recognition model by adjusting the depth recognition network based on the overall loss until the overall loss decreases to a lowest value.

In at least one embodiment of the present disclosure, the electronic device obtains the overall loss by performing a weighted average operation on the depth loss and the target height loss.

In this embodiment, the overall loss equals a sum of the depth loss and the target height loss. Since the depth loss can more accurately reflect the difference between the first image and the second image, by adjusting the deep network based on the overall loss, a learning ability of the deep network can be improved so that a recognition accuracy of the deep recognition model is higher.

Figure 5:
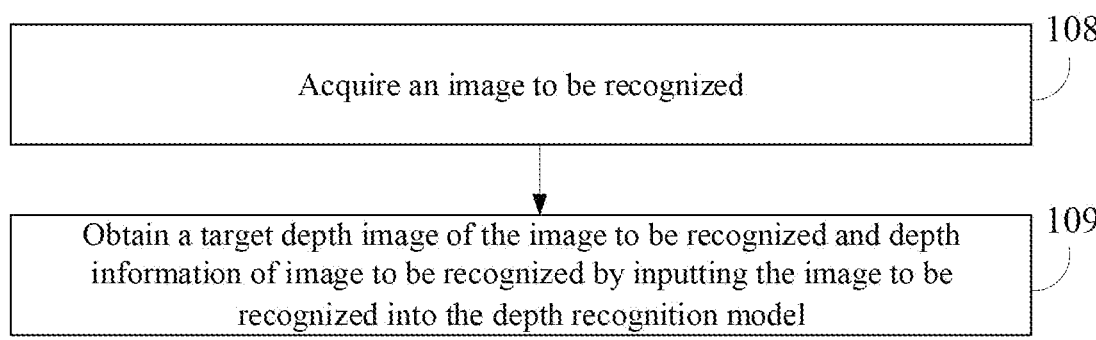
FIG. 5 is a schematic structural diagram of an embodiment of an image depth recognition method provided by the present disclosure.

As shown in FIG. 5, it is a flowchart of an image depth recognition method provided by an embodiment of the present disclosure.

According to different requirements, a sequence of each block in the flow chart can be adjusted according to actual detection requirements, and some blocks can be omitted. The execution body of the method is an electronic device, such as the electronic device 1 shown in FIG. 1.

At block 108, the electronic device acquires an image to be recognized.

In at least one embodiment of the present disclosure, the image to be recognized refers to an image for which depth information needs to be recognized.

In at least one embodiment of the present disclosure, the acquiring the image to be recognized includes:

Acquiring the image to be recognized from a preset database.

The preset database may be a KITTI database, a Cityscapes database, a vKITTI database, or the like. The deep recognition network can be a deep neural network, and the deep recognition network can be obtained from a database on the Internet.

At block 109, the electronic device inputs the image to be recognized into the depth recognition model, and obtains a target depth image of the image to be recognized and depth information of image to be recognized.

In at least one embodiment of the present disclosure, the target depth image refers to an image including depth information of each pixel point in the image to be recognized, and the depth information of each pixel point in the image to be recognized refers to a distance between an object to be recognized corresponding to each pixel point in the image to be recognized and the camera device that captures the image to be recognized.

In at least one embodiment of the present disclosure, a method of generating the target depth image is basically the same as the method of generating the initial depth image, so the present disclosure will not repeat them here.

In at least one embodiment of the present disclosure, the electronic device determines the pixel value of each pixel point in the target depth image as the depth information of the corresponding pixel point in the image to be recognized.

Through the above-mentioned embodiments, since a precision of the depth recognition model is improved, a precision of recognizing the depth of the image to be recognized can be improved.

To sum up, the present disclosure constructs the ground plane segmentation network. Since the ground plane segmentation network is generated by reducing some parameters of the high-resolution network under the condition of ensuring the segmentation accuracy, it can reduce the number of running time of the ground plane segmentation network, so that the ground plane area can be accurately and quickly segmented. A target height loss for the depth recognition network is generated based on the camera device, the initial depth image, and the ground plane region in the first image. Since the target height loss is generated according to the predicted height between the pixel points of the ground plane area and the camera device and the actual height between the pixel points of the ground plane area and the camera device, by using the target height loss to adjust the depth network can make the prediction height corresponding to each pixel point in the image to be recognized by the depth recognition network more accurate. Based on the depth loss and the target height loss, the depth recognition model obtained by adjusting the depth recognition network can be obtained from the luminosity, gradient of the image to be recognized, and the predicted height between each pixel point and the camera device. In this aspect, the depth recognition of the image to be recognized is comprehensively performed, so that the depth information in the image to be recognized can be quickly and accurately recognized, thereby improving the efficiency of recognizing image depth.

Figure 6:
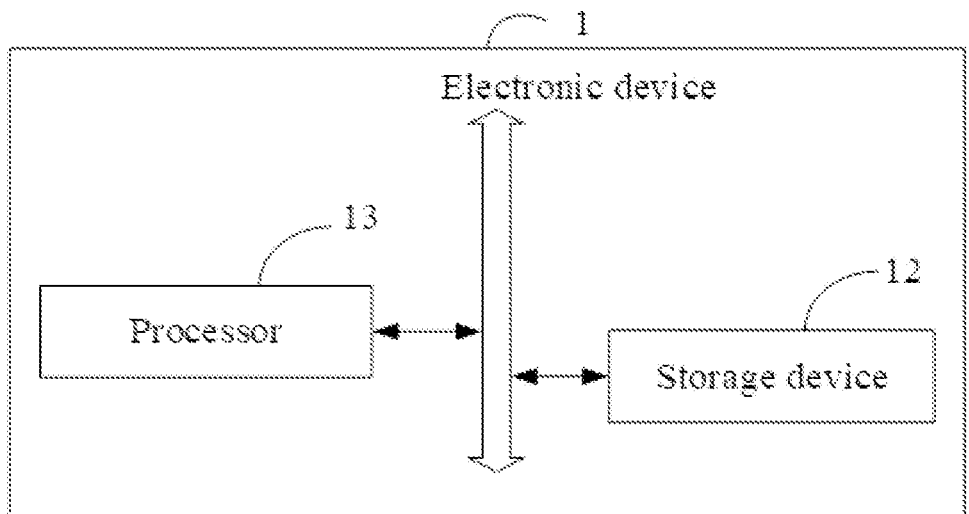
FIG. 6 is a schematic structural diagram of one embodiment of an electronic device provided by the present disclosure.

As shown in FIG. 6, it is a structural diagram of an electronic device according to one embodiment of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of recognizing image depth, a program of training a depth recognition model.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device 1.

The processor 13 obtains the operating system of the electronic device 1 and obtains various installed applications. The processor 13 obtains the application program to implement each block in the embodiments of the foregoing deep recognition model training method, for example, to implement each block shown in FIG. 2 and FIG. 5.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2 and FIG. 5, the storage device 12 in the electronic device 1 stores a plurality of instructions, and the processor 13 can execute the plurality of instructions to implement the method of training the deep recognition model as shown in FIG. 2, and the method of recognizing the depth information of the image as shown in FIG. 5.

Specifically, for the specific implementation method of the above-mentioned instruction by the processor 13, reference may be made to the description of the relevant blocks in the corresponding embodiments of FIG. 2 and FIG. 5, and details are not repeated.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A deep recognition model training method applied to an electronic device, the electronic device being connected to a camera device, the method comprising:

acquiring a first image and a second image captured by the camera device;

constructing a ground plane segmentation network;

determining a ground plane area in the first image by segmenting the first image using the ground plane segmentation network;

generating a projection image of the first image based on the first image, an initial depth image corresponding to the first image, and a pose matrix corresponding to the first image and the second image;

generating a target height loss of a depth recognition network based on the depth recognition network, the camera device, the initial depth image, and the ground plane area in the first image;

calculating a depth loss of the depth recognition network according to a gradient loss between the initial depth image and the first image and a photometric loss between the projection image and the first image;

obtaining a depth recognition model by adjusting the depth recognition network based on the depth loss and the target height loss;

acquiring an image to be recognized; and obtaining a target depth image of the image to be recognized and depth information of the image to be recognized by inputting the image to be recognized into the depth recognition model.

2. The deep recognition model training method according to claim 1, wherein the constructing the ground plane segmentation network comprises:

acquiring a high-resolution network, wherein the high-resolution network comprises a first-stage network, a second-stage network, a third-stage network, a fourth-stage network, and an output layer;

removing the fourth-stage network, and adjusting a number of branch networks in the output layer to be a number of branch networks in the third-stage network;

obtaining an output layer corresponding to each branch network in the third-stage network;

counting a number of first channels of a last convolutional layer in a backbone network of the first-stage network;

obtaining a first resolution network by adjusting the number of first channels to a first preset value;

obtaining a second resolution network by adjusting a number of channels of a last convolutional layer in the second-stage network;

obtaining a third resolution network by adjusting a number of channels of a last convolutional layer in the third-stage network;

obtaining an image resolution network by splicing the first resolution network, the second resolution network, and the third resolution network;

obtaining the ground plane segmentation network by splicing the image resolution network and the output layer corresponding to each branch network in the third stage network.

3. The deep recognition model training method according to claim 2, wherein the ground plane segmentation network comprises a classification layer, and the determining the ground plane area in the first image by segmenting the first image using the ground plane segmentation network comprises:

inputting the first image into the image resolution network of the ground plane segmentation network, and obtaining a plurality of third branch feature maps each of which being output by each branch network in the third resolution network of the image resolution network;

obtaining a plurality of target feature maps by inputting each of the plurality of third branch feature maps into a corresponding output layer to perform a convolution operation;

obtaining a fused feature map by performing feature fusion on the plurality of target feature maps;

obtaining a category corresponding to each initial object in the first image by inputting the fused feature map into the classification layer for classification; and determining an area occupied by an initial object corresponding to a category of ground plane as the ground plane area.

4. The deep recognition model training method according to claim 3, wherein the inputting the first image into the image resolution network of the ground plane segmentation network, and obtaining the plurality of third branch feature maps each of which being output by each branch network in the third resolution network of the image resolution network comprises:

obtaining a first backbone feature map output by the backbone network of the first resolution network by inputting the first image into the backbone network of the first resolution network for feature extraction;

obtaining a plurality of first branch feature maps each of which being output by each branch network in the first resolution network by inputting the first backbone feature map into each branch network of the first resolution network for performing a convolution operation;

obtaining a plurality of second branch feature maps each of which being output by the second resolution network by inputting the plurality of first branch feature maps into the second resolution network for feature extraction; and obtaining the plurality of third branch feature maps by inputting the plurality of second branch feature maps into the third resolution network for performing feature extraction.

5. The deep recognition model training method according to claim 1, wherein the first image and the second image contain a same initial object, and the generating the projection image of the first image based on the first image, the initial depth image corresponding to the first image, and the pose matrix corresponding to the first image and the second image comprises:

determining pixel points corresponding to the same initial object in the first image as first pixel points, and determining pixel points corresponding to the same initial object in the second image as second pixel points;

obtaining a first homogeneous coordinate matrix of the first pixel points, obtaining a second homogeneous coordinate matrix of the second pixel points;

obtaining an inverse matrix of an internal reference matrix of the camera device;

calculating first camera coordinates of the first pixel points according to the first homogeneous coordinate matrix and the inverse matrix of the internal reference matrix;

calculating second camera coordinates of the second pixel points according to the second homogeneous coordinate matrix and the inverse matrix of the internal parameter matrix;

obtaining a rotation matrix and a translation matrix according to the first camera coordinates and the second camera coordinates based on a preset epipolar constraint relationship;

obtaining the pose matrix by splicing the rotation matrix and the translation matrix;

obtaining a homogeneous coordinate matrix of each pixel point in the first image, and obtaining a depth value of each pixel point in the first image from the initial depth image;

calculating projection coordinates of each pixel point in the first image based on the pose matrix, each homogeneous coordinate matrix of each pixel point and the depth value of each pixel point; and obtaining the projected image by arranging the pixel points of the first image according to the projection coordinates of the pixel points.

6. The deep recognition model training method according to claim 5, wherein the generating the target height loss of the depth recognition network based on the depth recognition network, the camera device, the initial depth image, and the ground plane area in the first image comprises:

acquiring a real world height from an optical center of the camera device to the ground plane area;

constructing a camera coordinate system based on the first image and the camera device;

calculating a projection height according to the coordinates of each ground pixel point of the ground plane area in the constructed camera coordinate system; and calculating the target height loss according to the pixel coordinates of the pixel points in the initial depth image, the projection height, and the real world height.

7. The deep recognition model training method according to claim 6, wherein the calculating the projection height according to the coordinates of each ground pixel point of the ground plane area in the constructed camera coordinate system comprises:

obtaining coordinates of any one ground pixel point in the ground plane area in the camera coordinate system;

calculating a unit normal vector according to the coordinates of any one ground pixel point;

determining an optical center of the camera device as a starting point, and determining each ground pixel point as an end point;

determining a vector formed by the starting point and the end point as a target vector of each ground pixel point;

calculating a projection distance corresponding to each ground pixel point according to the target vector of each ground pixel point and the unit normal vector; and obtaining the projection height by performing a weighted average operation on the projection distances corresponding to all ground pixel points.

8. The deep recognition model training method according to claim 6, wherein the calculating the target height loss according to the pixel coordinates of the pixel points in the initial depth image, the projection height, and the real world height comprises:

calculating a height ratio between the real world height and the projection height;

obtaining depth coordinates corresponding to each pixel point by multiplying the height ratio with the pixel coordinates of each pixel point in the initial depth image;

generating a first height loss according to the pixel coordinates and the corresponding depth coordinates of each pixel point in the initial depth image;

obtaining a multiplication matrix by multiplying the translation matrix and the height ratio;

generating a second height loss according to the multiplication matrix and the translation matrix; and generating the target height loss based on the first height loss and the second height loss.

9. An electronic device comprising:

a storage device;

at least one processor; and the storage device storing one or more programs, which when executed by the at least one processor, cause the at least one processor to:

acquire a first image and a second image captured by a camera device;

construct a ground plane segmentation network;

determine a ground plane area in the first image by segmenting the first image using the ground plane segmentation network;

generate a projection image of the first image based on the first image, an initial depth image corresponding to the first image, and a pose matrix corresponding to the first image and the second image;

generate a target height loss of a depth recognition network based on the depth recognition network, the camera device, the initial depth image, and the ground plane area in the first image;

calculate a depth loss of the depth recognition network according to a gradient loss between the initial depth image and the first image and a photometric loss between the projection image and the first image;

obtain a depth recognition model by adjusting the depth recognition network based on the depth loss and the target height loss;

acquire an image to be recognized; and obtain a target depth image of the image to be recognized and depth information of the image to be recognized by inputting the image to be recognized into the depth recognition model.

10. The electronic device according to claim 9, wherein the at least one processor constructs the ground plane segmentation network by:

acquiring a high-resolution network, wherein the high-resolution network comprises a first-stage network, a second-stage network, a third-stage network, a fourth-stage network, and an output layer;

removing the fourth-stage network, and adjusting a number of branch networks in the output layer to be a number of branch networks in the third-stage network;

obtaining an output layer corresponding to each branch network in the third-stage network;

counting a number of first channels of a last convolutional layer in a backbone network of the first-stage network;

obtaining a first resolution network by adjusting the number of first channels to a first preset value;

obtaining a second resolution network by adjusting a number of channels of a last convolutional layer in the second-stage network;

obtaining a third resolution network by adjusting a number of channels of a last convolutional layer in the third-stage network;

obtaining an image resolution network by splicing the first resolution network, the second resolution network, and the third resolution network;

obtaining the ground plane segmentation network by splicing the image resolution network and the output layer corresponding to each branch network in the third stage network.

11. The electronic device according to claim 10, wherein the ground plane segmentation network comprises a classification layer, and the at least one processor determines the ground plane area in the first image by segmenting the first image using the ground plane segmentation network by:

inputting the first image into the image resolution network of the ground plane segmentation network, and obtaining a plurality of third branch feature maps each of which being output by each branch network in the third resolution network of the image resolution network;

obtaining a plurality of target feature maps by inputting each of the plurality of third branch feature maps into a corresponding output layer to perform a convolution operation;

obtaining a fused feature map by performing feature fusion on the plurality of target feature maps;

obtaining a category corresponding to each initial object in the first image by inputting the fused feature map into the classification layer for classification; and determining an area occupied by an initial object corresponding to a category of ground plane as the ground plane area.

12. The electronic device according to claim 11, wherein the at least one processor inputs the first image into the image resolution network of the ground plane segmentation network, and obtains the plurality of third branch feature maps each of which being output by each branch network in the third resolution network of the image resolution network by:

obtaining a first backbone feature map output by the backbone network of the first resolution network by inputting the first image into the backbone network of the first resolution network for feature extraction;

obtaining a plurality of first branch feature maps each of which being output by each branch network in the first resolution network by inputting the first backbone feature map into each branch network of the first resolution network for performing a convolution operation;

obtaining a plurality of second branch feature maps each of which being output by the second resolution network by inputting the plurality of first branch feature maps into the second resolution network for feature extraction; and obtaining the plurality of third branch feature maps by inputting the plurality of second branch feature maps into the third resolution network for performing feature extraction.

13. The electronic device according to claim 9, wherein the first image and the second image contain a same initial object, and the at least one processor generates the projection image of the first image based on the first image, the initial depth image corresponding to the first image, and the pose matrix corresponding to the first image and the second image by:

determining pixel points corresponding to the same initial object in the first image as first pixel points, and determining pixel points corresponding to the same initial object in the second image as second pixel points;

obtaining a first homogeneous coordinate matrix of the first pixel points, obtaining a second homogeneous coordinate matrix of the second pixel points;

obtaining an inverse matrix of an internal reference matrix of the camera device;

calculating first camera coordinates of the first pixel points according to the first homogeneous coordinate matrix and the inverse matrix of the internal reference matrix;

calculating second camera coordinates of the second pixel points according to the second homogeneous coordinate matrix and the inverse matrix of the internal parameter matrix;

obtaining a rotation matrix and a translation matrix according to the first camera coordinates and the second camera coordinates based on a preset epipolar constraint relationship;

obtaining the pose matrix by splicing the rotation matrix and the translation matrix;

obtaining a homogeneous coordinate matrix of each pixel point in the first image, and obtaining a depth value of each pixel point in the first image from the initial depth image;

calculating projection coordinates of each pixel point in the first image based on the pose matrix, each homogeneous coordinate matrix of each pixel point and the depth value of each pixel point; and obtaining the projected image by arranging the pixel points of the first image according to the projection coordinates of the pixel points.

14. The electronic device according to claim 13, wherein the at least one processor generates the target height loss of the depth recognition network based on the depth recognition network, the camera device, the initial depth image, and the ground plane area in the first image by:

acquiring a real world height from an optical center of the camera device to the ground plane area;

constructing a camera coordinate system based on the first image and the camera device;

calculating a projection height according to the coordinates of each ground pixel point of the ground plane area in the constructed camera coordinate system; and calculating the target height loss according to the pixel coordinates of the pixel points in the initial depth image, the projection height, and the real world height.

15. The electronic device according to claim 14, wherein the at least one processor calculates the projection height according to the coordinates of each ground pixel point of the ground plane area in the constructed camera coordinate system by:

obtaining coordinates of any one ground pixel point in the ground plane area in the camera coordinate system;

calculating a unit normal vector according to the coordinates of any one ground pixel point;

determining an optical center of the camera device as a starting point, and determining each ground pixel point as an end point;

determining a vector formed by the starting point and the end point as a target vector of each ground pixel point;

calculating a projection distance corresponding to each ground pixel point according to the target vector of each ground pixel point and the unit normal vector; and obtaining the projection height by performing a weighted average operation on the projection distances corresponding to all ground pixel points.

16. The electronic device according to claim 14, wherein the at least one processor calculates the target height loss according to the pixel coordinates of the pixel points in the initial depth image, the projection height, and the real world height by:

calculating a height ratio between the real world height and the projection height;

obtaining depth coordinates corresponding to each pixel point by multiplying the height ratio with the pixel coordinates of each pixel point in the initial depth image;

generating a first height loss according to the pixel coordinates and the corresponding depth coordinates of each pixel point in the initial depth image;

obtaining a multiplication matrix by multiplying the translation matrix and the height ratio;

generating a second height loss according to the multiplication matrix and the translation matrix; and generating the target height loss based on the first height loss and the second height loss.

17. A non-transitory storage medium having instructions stored thereon, when the instructions are executed by a processor of an electronic device being connected to a camera device, the processor is caused to perform a deep recognition model training method, wherein the method comprises:

acquiring a first image and a second image captured by the camera device;

constructing a ground plane segmentation network;

determining a ground plane area in the first image by segmenting the first image using the ground plane segmentation network;

generating a projection image of the first image based on the first image, an initial depth image corresponding to the first image, and a pose matrix corresponding to the first image and the second image;

generating a target height loss of a depth recognition network based on the depth recognition network, the camera device, the initial depth image, and the ground plane area in the first image;

calculating a depth loss of the depth recognition network according to a gradient loss between the initial depth image and the first image and a photometric loss between the projection image and the first image;

obtaining a depth recognition model by adjusting the depth recognition network based on the depth loss and the target height loss;

acquiring an image to be recognized; and obtaining a target depth image of the image to be recognized and depth information of the image to be recognized by inputting the image to be recognized into the depth recognition model.

18. The non-transitory storage medium according to claim 17, wherein the constructing the ground plane segmentation network comprises:

acquiring a high-resolution network, wherein the high-resolution network comprises a first-stage network, a second-stage network, a third-stage network, a fourth-stage network, and an output layer;

removing the fourth-stage network, and adjusting a number of branch networks in the output layer to be a number of branch networks in the third-stage network;

obtaining an output layer corresponding to each branch network in the third-stage network;

counting a number of first channels of a last convolutional layer in a backbone network of the first-stage network;

obtaining a first resolution network by adjusting the number of first channels to a first preset value;

obtaining a second resolution network by adjusting a number of channels of a last convolutional layer in the second-stage network;

obtaining a third resolution network by adjusting a number of channels of a last convolutional layer in the third-stage network;

obtaining an image resolution network by splicing the first resolution network, the second resolution network, and the third resolution network;

obtaining the ground plane segmentation network by splicing the image resolution network and the output layer corresponding to each branch network in the third stage network.

* * * * *